(12) United States Patent
Hidayat et al.

(10) Patent No.: US 8,615,708 B1
(45) Date of Patent: Dec. 24, 2013

(54) TECHNIQUES FOR LIVE STYLING A WEB PAGE

(75) Inventors: Ariya Hidayat, Mountain View, CA (US); Tommy Maintz, Haarlem (NL)

(73) Assignee: Sencha, Inc., Redwood City, CA (US)

( * ) Notice: Subject to any disclaimer, the term of this patent is extended or adjusted under 35 U.S.C. 154(b) by 262 days.

(21) Appl. No.: 13/299,782

(22) Filed: Nov. 18, 2011

(51) Int. Cl.
*G06F 17/00* (2006.01)

(52) U.S. Cl.
USPC .......................................... 715/236; 715/235

(58) Field of Classification Search
USPC ................................................. 715/235, 236
See application file for complete search history.

(56) References Cited

U.S. PATENT DOCUMENTS

| | | | |
|---|---|---|---|
| 6,507,857 B1 * | 1/2003 | Yalcinalp | 715/235 |
| 6,792,577 B1 * | 9/2004 | Kimoto | 715/235 |
| 6,799,299 B1 * | 9/2004 | Li et al. | 715/235 |
| 6,912,529 B1 * | 6/2005 | Kolfman | 1/1 |
| 6,918,090 B2 * | 7/2005 | Hesmer et al. | 715/760 |
| 6,993,711 B1 * | 1/2006 | Tanaka et al. | 715/248 |
| 7,143,344 B2 * | 11/2006 | Parker et al. | 715/236 |
| 7,194,683 B2 * | 3/2007 | Hind et al. | 715/235 |
| 7,284,199 B2 * | 10/2007 | Parasnis et al. | 715/201 |
| 7,765,467 B2 * | 7/2010 | Malek et al. | 715/234 |
| 2003/0002056 A1 * | 1/2003 | Yamaguchi et al. | 358/1.2 |
| 2004/0111670 A1 * | 6/2004 | Sasakuma et al. | 715/513 |
| 2004/0250200 A1 * | 12/2004 | Chung et al. | 715/500 |
| 2005/0004893 A1 * | 1/2005 | Sangroniz | 707/3 |
| 2008/0178072 A1 * | 7/2008 | Fiedorowicz et al. | 715/235 |
| 2008/0201328 A1 * | 8/2008 | Da Silva et al. | 707/6 |
| 2008/0313215 A1 * | 12/2008 | Beker et al. | 707/102 |
| 2010/0195131 A1 * | 8/2010 | Nakata | 358/1.13 |
| 2011/0125804 A1 * | 5/2011 | Aegerter | 707/802 |
| 2011/0295082 A1 * | 12/2011 | Craw et al. | 600/301 |
| 2012/0036452 A1 * | 2/2012 | Coleman et al. | 715/751 |
| 2012/0278700 A1 * | 11/2012 | Sullivan et al. | 715/235 |
| 2013/0007598 A1 * | 1/2013 | Draper et al. | 715/235 |
| 2013/0088495 A1 * | 4/2013 | Bech | 345/467 |
| 2013/0159553 A1 * | 6/2013 | Price et al. | 709/246 |
| 2013/0159839 A1 * | 6/2013 | Joffray et al. | 715/235 |
| 2013/0232406 A1 * | 9/2013 | Sampathkumar et al. | 715/236 |
| 2013/0268846 A1 * | 10/2013 | Nakamura et al. | 715/236 |
| 2013/0283292 A1 * | 10/2013 | Van Der Sanden et al. | 719/313 |

OTHER PUBLICATIONS

Lie et al., Multipurpose Web Publishing, ACM 1999, pp. 95-101.*
Serrano, HSS: a Compiler for Cascading Style Sheets, ACM 2010, pp. 109-118.*
Abrams et al., UIML: an applicance-independent XML user interface language, Google 1999, pp. 1695-1708.*
Ono et al., XSLT Stylesheet Generation by Example with WYSIWYG Editing, IEEE 2002, pp. 1-10.*

\* cited by examiner

*Primary Examiner* — Cong-Lac Huynh
(74) *Attorney, Agent, or Firm* — Hickman Palermo Truong Becker Bingham Wong LLP; Adam C. Stone

(57) ABSTRACT

Techniques and mechanisms that assist web page developers in "live styling" a web page without having to repeatedly compile a meta-language style sheet are disclosed. In one embodiment, these techniques and mechanisms include styling functionality to help the developer of the web page carry out a cycle of a streamlined web page live styling process. With the styling functionality, the developer can direct input to a user interface control to change the value of a corresponding meta-language style sheet variable. In response to the input, presentation of the web page is virtually instantaneously updated to reflect the changed value. The developer may repeatedly direct input to the user interface controls until the desired web page appearance is achieved.

25 Claims, 6 Drawing Sheets

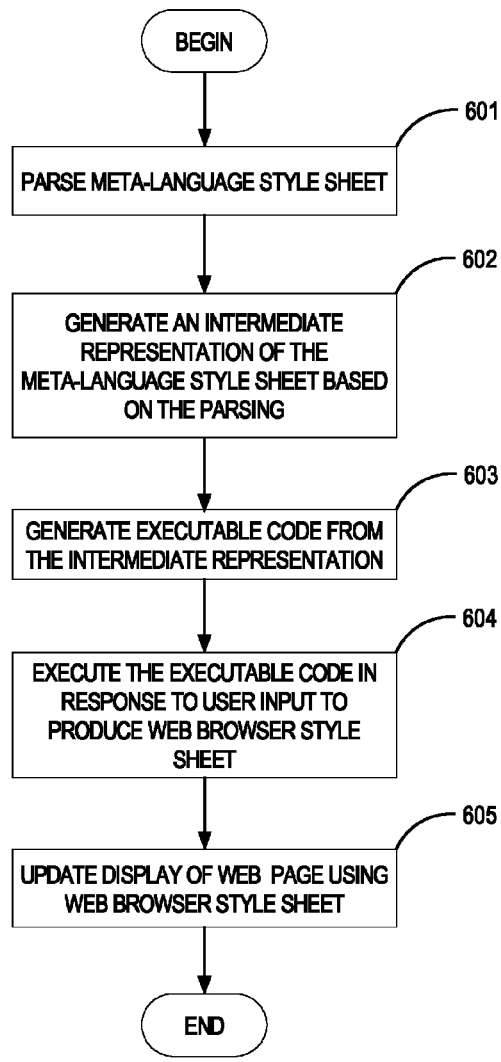

TECHNIQUES FOR LIVE STYLING A WEB PAGE

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The invention relates generally to web page development. More particularly, the invention relates to computer-implemented techniques that allow a user of the computer to virtually instantaneously see the effect a change to meta-language style sheet variable has on the appearance of a web page.

BACKGROUND

Content elements (e.g., text, images, buttons, panels, lists, forms, etc) of a web page are often visually styled through the application of web browser style sheet rules to the elements. Style sheet rules are typically specified by a developer of the web page in a web browser style sheet associated with the web page. The web browser, when rendering the web page, may parse the style sheet to determine the style sheet rules that are to be applied to the elements of the web page. Once the rules have been determined, the web browser may apply the style sheet rules to the elements so that the elements appear on the web page visually styled in accordance with the rules.

For example, a particular style sheet rule may specify the color of a particular web page element. The web browser, when rendering the web page, may apply the particular style sheet rule by coloring the particular element with the specified color. Web browser style sheets are often used by developers to separate the task of specifying the content of the web page from the task of defining the presentation of that content thereby making it easier for the developer to develop, maintain, and modify the web page.

Web page developers often create and maintain web browser style sheets "by hand" using a computer-based text editing application. Typically, this involves generating and modifying text statements according to a style sheet language. One widely used style sheet language is known as Cascading Style Sheets (CCS), the specification of which is developed and maintained by an industry community known as the World Wide Web Consortium (W3C).

A typical web browser style sheet contains a number of different style sheet rules. A style sheet rule may contain a selector and one or more style sheet declarations associated with that selector. The selector of a rule determines which elements of a web page the associated style sheet declarations apply to. A style sheet declaration may specify a style sheet property and a value of that property. For example, to set the text color of 'H1' elements to blue, the following style sheet rule may be used:

H1 {color: blue}.

In the above example, ('H1') is the selector and ('color: blue') is a style sheet declaration. The declaration has two parts: a style sheet property ('color') and a value ('blue'). As a typical style sheet may contain hundreds or even thousands of style sheet rules, managing style sheets by hand is often a cumbersome and error-prone task for developers.

More recently, in an effort to make the creation and maintenance of web browser style sheets more manageable, style sheet meta-languages have been developed. Typically, these meta-languages are scripting languages that extend a style sheet language with useful programming language mechanisms such as variables, nesting, mix-ins, and inheritance. A style sheet meta-language compiler may be used to compile a meta-language style sheet to a web browser style sheet. Some examples of currently available style sheet meta-language compilers are: the Syntactically Awesome Style Sheets (SASS) compiler currently available on the Internet from the sass-lang.com domain and the LESS compiler currently available on the Internet from the lesscss.org domain.

For example, a developer may author the following meta-language style sheet that, among other things, declares and references the meta-language style sheet variables ('$blue') and ('$margin'), invokes the meta-language style sheet function ('darken'), and specifies basic math operations:

```
01: $blue: #3bbfce
02: $margin: 16px
03:
04: .content-navigation
05: border-color: $blue
06: color: darken($blue, 9%)
07:
08: .border
09: padding: $margin/2
10: margin: $margin/2
11: border-color: $blue
```

The above meta-language style sheet, when compiled, may produce the following web browser style sheet:

```
01: .content-navigation {
02: border-color: #3bbfce;
03: color: #2b9eab;
04: }
05:
06: .border {
07: padding: 8px;
08: margin: 8px;
09: border-color: #3bbfce;
10: }
```

In particular, a meta-language compiler, among other operations, when compiling the above-example meta-language style sheet to produce the web browser style sheet, substituted the declared values of the ('$blue') and ('$margin') variables for the references to those variables, invoked the ('darken') function to darken the declared red-green-blue (RGB) value ('#3bbfce') of the ('$blue') variable by 9 percent to produce the darkened RGB value ('#2b9eab'), and divided the declared value ('16px') of the ('$margin') variable by 2 to produce a final value ('8px').

Use of meta-language style sheets can make web page development easier for developers. For example, if the developer of the above meta-language style sheet desired a padding and margin of ('6px') instead of ('8px'), the developer may apply a single edit to the meta-language style sheet that specifies a value of ('12px') for the ('$margin') variable and then compile the meta-language style sheet to produce the desired web browser style sheet. This could be done instead of editing the web browser style sheet directly which, in this example, would require the developer to apply two edits, one each for the values of the ('padding') and ('margin') style sheet property declarations. Similarly, if the developer desired a lighter shade of blue for the values of the two ('border-color') style sheet properties, the developer could apply a single edit to the value of the ('$blue') variable in the meta-language style sheet instead of applying two edits to the web browser style sheet. Further, the developer would not be required to perform math to calculate the 9 percent darkened RGB value for the ('color') style sheet property based on the new RGB value for the ('$blue') variable. Instead, that math would be automatically performed by the ('darken') function when the edited meta-language style sheet is compiled by the meta-language compiler to a web browser style sheet. Thus, meta-language style sheets and compilers make some web browser style sheet creation and maintenance tasks easier for developers.

While meta-language style sheets can improve the web page development process, the development cycle time between making an edit to a meta-language style sheet and viewing the results of the edit as applied and displayed in a web page can be lengthy and repetitive. For example, assume a developer of a web page that applies the above web browser style sheet desires to see how the web page will appear in a web browser if the blue color is darkened by 15% instead of 9%. To do so under current web page development approaches, the developer may need to: (1) edit a meta-language style sheet file, (2) compile the meta-language style sheet to produce a new web browser style sheet, and (3) reload the web page in the web browser so that the new web browser style sheet is applied to the web page. This development cycle may be tedious and time consuming for the developer, especially if the developer desires to see how the web page will appear for multiple different percentages. For example, under current approaches, if the developer desires to see how the web page will appear at 12%, 13%, 14%, 15%, and so on up to 20%, the developer would need to perform the edit, compile, and reload steps for each different percentage.

Based on the foregoing, it is clearly desirable to help web page developers reduce the development cycle time between changing the value of a meta-language style sheet variable and viewing the results of the change as applied to the web page.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

FIG. 6 is a flowchart illustrating a method of live styling a web page without having to repeatedly compile a meta-language style sheet.

DETAILED DESCRIPTION OF EMBODIMENTS

General Overview

Computer-implemented techniques and mechanisms that assist web page developers in "live styling" a web page without having to repeatedly compile a meta-language style sheet are disclosed. In this description, "web page live styling" refers to a process performed by a developer of the web page in which the developer repeatedly "tunes" or adjusts meta-language style sheet variables until the desired "look and feel" of the web page is achieved. For example, the developer may repeatedly adjust a meta-language style sheet variable affecting the color of certain web page elements until the desired color scheme for the web page is realized.

With the disclosed techniques and mechanisms, a developer may change the value of a meta-language style sheet variable and virtually instantaneously receive visual feedback on how the change affects the appearance of the web page. In one embodiment, these techniques and mechanisms include pre-styling functionality, styling functionality, and post-styling functionality to help the developer of the web page carry out a streamlined web page live styling process.

With the pre-styling functionality, a user interface is provided to the developer that initially presents the web page styled according to an input meta-language style sheet. The user interface also presents one or more user interface controls (e.g., sliders, textboxes, etc) by which the developer can adjust value(s) of one or more meta-language style sheet variable(s) declared in the input meta-language style sheet.

With the styling functionality, the developer can direct input to a user interface control to change the value of a corresponding meta-language style sheet variable. In response to the input, the presented web page is virtually instantaneously updated to reflect the changed value. The developer may repeatedly direct input to the user interface controls until the desired web page appearance is achieved. With the styling functionality, repetitive compilation of a meta-language style sheet to web browser style sheet is not required.

Once the developer has settled on the desired appearance of the web page, the post-styling functionality allows the developer to capture the changes to the input meta-language style sheet in the form of an output meta-language style sheet and an output web browser style sheet. The pre-styling functionality, styling functionality, and post-styling functional is described in greater detail below.

A Cumbersome Approach to Web Page Live Styling

Figure 1:
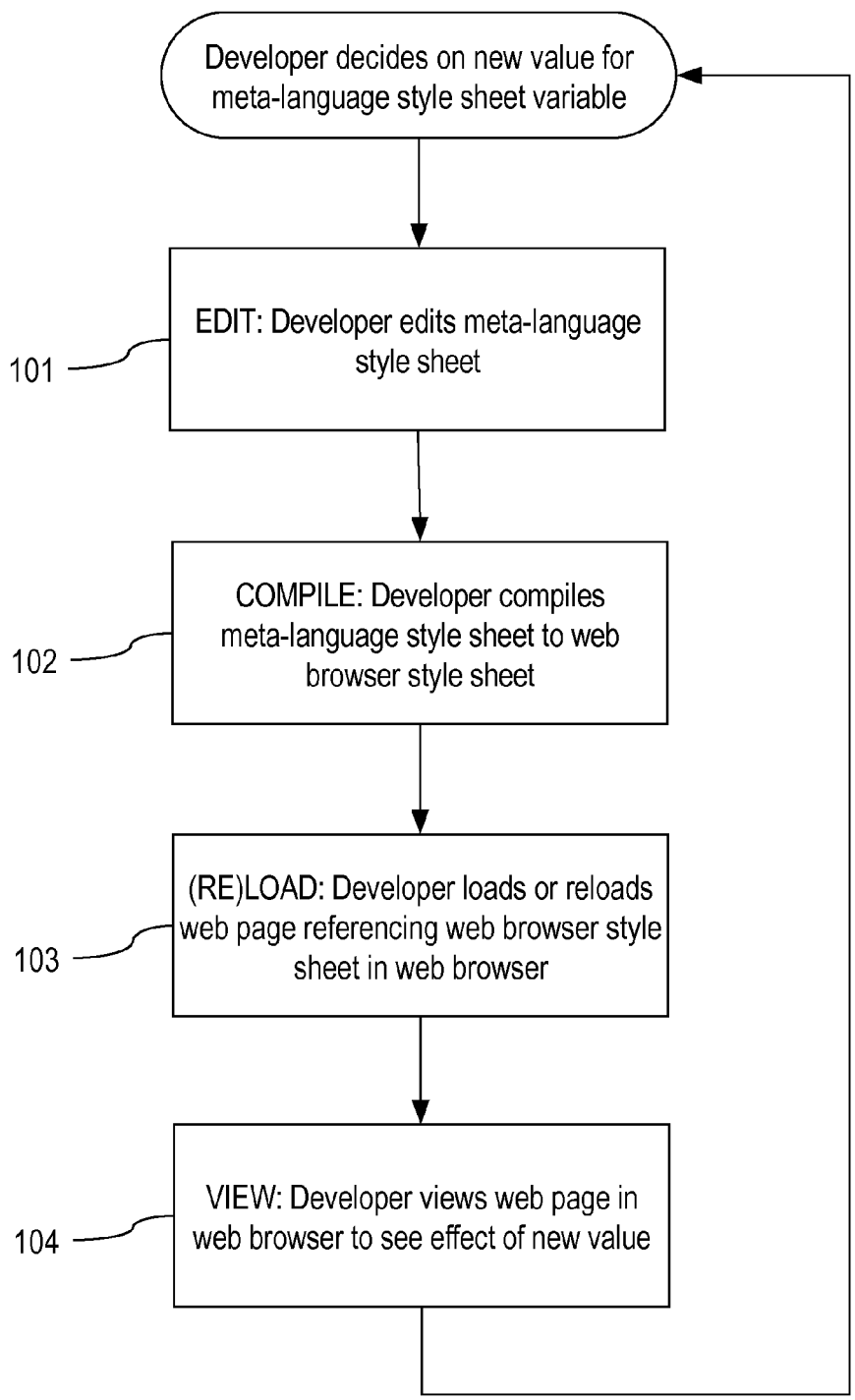
FIG. 1 is a flow chart of a cumbersome web page live styling process.

One possible live styling process would require the developer to perform a number of cumbersome steps. This cumbersome live styling process is depicted in FIG. 1.

Under the cumbersome process 100, once the developer decides on a new value for a meta-language style sheet variable, to see how the new value affects the look and feel of a web page, the developer is required to perform the steps of edit 101, compile 102, (re)load 103, and view 104.

In the edit 101 step, the developer edits a meta-language style sheet to set, change, or modify the meta-language style sheet variable to the new value. For example, the developer may edit the meta-language style sheet using a computer-based text editor or other computer-based editing application. In addition, the developer may be required to "save" the meta-language style sheet to a non-volatile computer-readable medium (e.g., a hard disk) to make the effect of the change to the meta-language style sheet permanent.

Next, in the compile 102 step, the developer compiles the meta-language style sheet to a web browser style sheet. Typically, this involves the developer commanding a computer-based meta-language style sheet compiler to compile the edited meta-language style sheet. For example, the developer may command the compiler through a computer command line interface or a computer graphical user interface (GUI). Alternatively, a program may monitor a file containing the meta-language style sheet and automatically invoke the compiler when a change is made to the file.

While compilation of the meta-language style sheet to a web browser style sheet is largely if not entirely automated by the compiler, the compilation itself can take a number of seconds, if not minutes, to complete depending on the computing resources (e.g., CPU, memory, etc.) available to the compiler. During compilation, the developer often waits idly until the compiler completes the compilation. The developer may perform another task while the meta-language style sheet is being compiled. However, this requires the developer to context switch from the live styling task to the other task and back to the live styling task when the compilation completes. Such context switching can cause the developer to make mistakes in task performance or otherwise reduce the developer's efficiency.

Once the edited meta-language style sheet has been compiled to a web browser style sheet, the developer next loads or reloads (step 103) a web page that references the web browser style sheet in a web browser. Finally, the developer views (step 104) the web page in the web browser to see how the new value affects the appearance of the web page.

If the developer decides on another new value for a meta-language style sheet variable, the developer must repeat steps 101-104 again for the other new value in order to see the effect of the new value on the look and feel of the web page. This repetition may be inconvenient and cumbersome for the developer. Further, the developer may desire to make multiple fine-grained adjustments to a meta-language style sheet variable to see the effect of the various values have on the look and feel of the web page. Repeatedly performing steps 101-104 for each fined-grained adjustment may be tedious for the developer.

A Streamlined Approach to Web Page Live Styling

Figure 2:
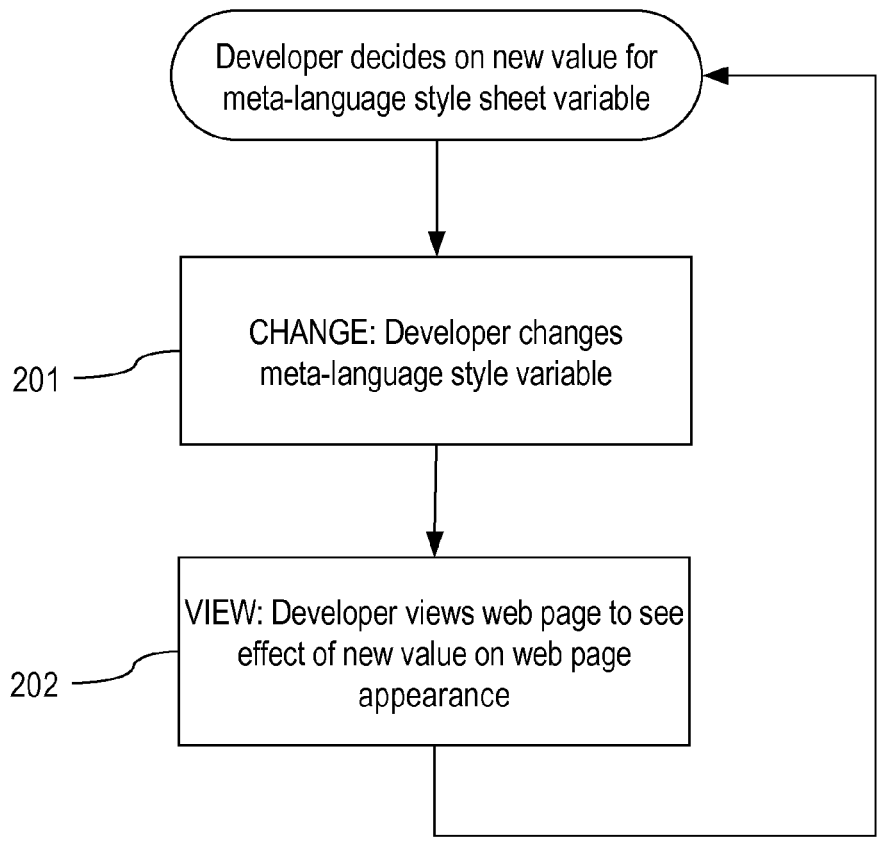
FIG. 2 is a flow chart of a streamlined web page live styling process.

In contrast, the techniques and mechanisms disclosed herein assist a web page developer in conducting a much more streamlined live styling process. This streamlined live styling process is depicted in FIG. 2.

The streamlined process 200 requires only two steps by the developer: change (step 201) and view (step 202). In particular, with the techniques, the developer can change (step 201) a meta-language style sheet variable and virtually instantaneously view (step 202) the effect of the change on the appearance (look and feel) of a web page. Significantly, compilation of a meta-language style sheet after making the change is not required. As a result, the time between a developer deciding on a new value for a meta-language style sheet variable and viewing the effect of that change on the appearance of a web page is dramatically reduced. Further, because of this reduced time period, making many fine-grained changes to a meta-language style sheet variable is more feasible and less time-consuming as each fine-grained change results in virtually instantaneous feedback to the developer. In one embodiment of the invention, the techniques reduce the feedback time from a matter of seconds or minutes under the cumbersome approach to a matter of milliseconds under the streamlined approach.

Sample Device

Figure 3:
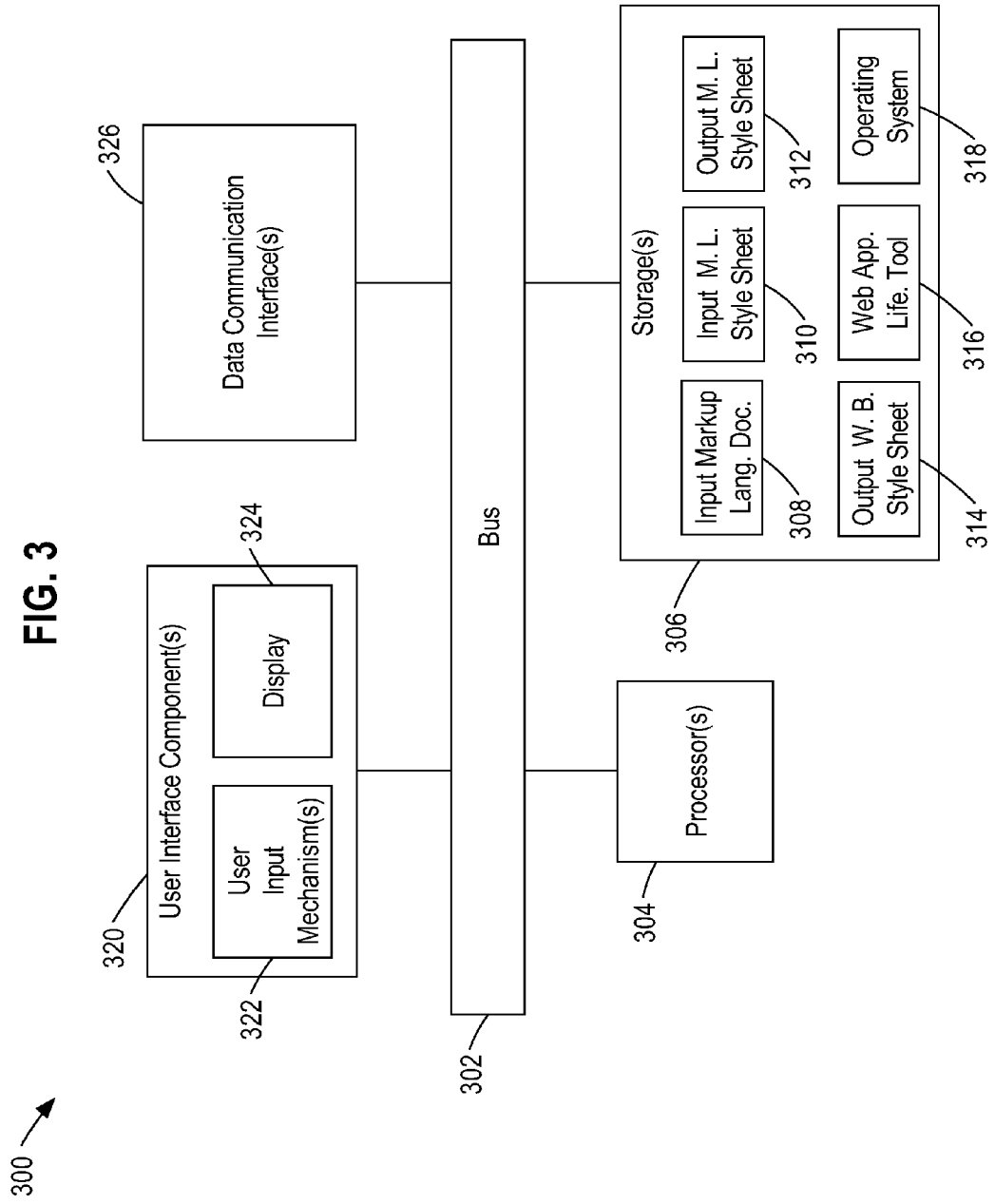
FIG. 3 is a block diagram of a sample device in which one embodiment of the present invention may be implemented.

According to some embodiments of the invention, the streamlined approach is facilitated by a web page live styling device. FIG. 3 is a block diagram showing various components of the web page live styling device generally designated as 300. Physically, these components can be located in a user's personal computing device such as a desktop computer, a laptop computer, a tablet computer, a smart phone, etc.

A bus 302 facilitates information exchange between components connected to the bus 302. One or more processors 304 coupled to the bus 302 execute instructions and process information. One or more storages 306 (also referred to herein as non-transitory computer-readable media) are coupled to the bus 302. Storage(s) 306 may be used to store executable programs (e.g., binaries, bytecode, scripts, etc.), permanent data (e.g. markup language documents, web browser style sheets, meta-language style sheets, associated metadata, etc.), temporary data that is generated during program execution (e.g., data structures representing meta-language style sheets, etc.), and any other information needed to carry out computer processing.

Storage(s) 306 may include any and all types of storages that may be used to carry out computer processing. For example, storage(s) 306 may include main memory (e.g. random access memory (RAM) or other dynamic storage device), cache memory, read only memory (ROM), permanent storage (e.g. one or more magnetic disks or optical disks, flash storage, etc.), as well as other types of storage including external storage (e.g., network attached storage (NAS), direct-attached storage (DAS), storage area network (SAN), etc.) coupled to the device 300 via data communication interface(s) 326. The various storages 306 may be volatile or non-volatile. Common forms of non-transitory computer-readable media include, for example, a floppy disk, a flexible disk, hard disk, magnetic tape, or any other magnetic medium, a CD-ROM, DVD, or any other optical storage medium, punchcards, papertape, or any other physical medium with patterns of holes, a RAM, a PROM, an EPROM, a FLASH-EPROM or any other type of flash memory, any memory chip or cartridge, and any other storage medium from which a computer can read.

Storage(s) 306 store several sets of executable instructions, including an operating system 318 and a web page livestyling tool 316. The processor(s) 304 execute the operating system 318 to provide a platform on which other sets of software may operate, and execute the web page livestyling tool 316 to provide additional, specific functionality described in greater detail below.

In one embodiment of the invention, the tool 316 and the operating system 318 cooperate to implement the techniques described herein. That is, portions of the techniques may be performed by the tool 316 and portions may be performed by the operating system 318. It should be noted though that this is just one possible embodiment. As an alternative, all of the techniques may be performed by the operating system 318. As a further alternative, all of the techniques may be performed by the tool 316. All such possible implementations are within the scope of the present invention.

In the embodiment shown in FIG. 3, the processor(s) 304 and the executable instructions 316 and/or instructions 318 may be thought of as forming a web page live styler that implements the techniques described herein. In such an implementation, the processors(s) 304 may be thought of as being "configured" by the executable instructions 316 and/or instructions 318 to carry out the techniques. This is just one possible implementation for the web page live styler. As an alternative, the web page live styler may be hardware implemented using a device (e.g. a programmable logic array) having an array of elements, including logic elements, wherein the elements are programmed or configured to implement the techniques described herein. As a further alternative, the web page live styler may be hardware implemented by way of another device such as an application specific integrated circuit (ASIC) having elements, including logic elements, that are constructed/configured to implement the techniques described herein. Overall, the web page live styler may be hardware implemented using any number of devices with elements, including logic elements, that are constructed/configured to implement the techniques described herein. These and other implementations of the web page live styler are possible. All such implementations are within the scope of the present invention.

Storage(s) 306 also store several sets of files, including input markup language document 308, input meta-language style sheet 310, output meta-language style sheet 312, and output web browser style sheet 314. The markup language document 308 and the meta-language style sheet 310 are inputs to the web page live styler. The meta-language style sheet 312 and the web browser style sheet 314 are outputs of the web page live styler.

The input markup language document 308 represents a web page and may be formatted according to a markup language (e.g., the HyperText Markup Language (HTML), the eXtensible HyperText Markup Language (HTML), the eXtensible Markup Language (XML), etc.). The input markup language document 308 contains markup language elements to which one or more meta-language style sheet rules defined in the input meta-language style sheet 310 apply. The markup language elements represent structure or desired behavior of the web page. A markup language element typically consists of three parts: a start tag, content, and an end tag. However, a given markup language element may not have any content or an end tag. Further, a given markup language element having content may not have an end tag. The input markup language document 308 may be created using any suitable technique for creating markup language documents such as by a user using a text editor, as one example.

The input meta-language style sheet 310 may be formatted according to a meta-language style sheet language (e.g., the Syntactically Awesome Style Sheet (SASS) language, the LESS language, etc). The input meta-language style sheet 310 contains one or more meta-language style sheet variable declarations and one or more meta-language style sheet rule definitions that reference the one or more meta-language style sheet variables. The meta-language style sheet rule definitions are generally the same or similar in form to web browser style sheets rule definitions except that the meta-language style sheet rule definitions may, among other differences, reference (e.g., by variable name) meta-language style sheet variables declared in the input meta-language style sheet 310. A meta-language style sheet variable declaration typically has two parts: a variable name and an initial value. For example, the input meta-language style sheet 310 may contain the following line of text
 1: $blue: #3bbfce
In the above example line of text, the dollar sign character ('$') indicates the start of a meta-language style sheet variable declaration, the text string ('blue') is the declared name of the meta-language style sheet variable, the text string ('#3bbfce') is the initial value assigned to the meta-language style sheet variable, and the colon character (':') separates the declared variable name from the specified initial value.

As mentioned, the input meta-language style sheet 310 may contain one or more meta-language style sheet rule definitions that reference the one or more meta-language style sheet variables declared in the input meta-language style sheet 310. A meta-language style sheet rule definition may contain a web browser style sheet selector and zero or more meta-language style sheet declarations and zero or more web browser style sheet declarations. A meta-language style sheet declaration may be different from a web browser style sheet declaration in that a meta-language style sheet declaration may reference one or more meta-language style sheet variables declared in the input meta-language style sheet 310. Both a meta-language style sheet declaration and a web browser style sheet declaration may specify a web browser style sheet property and a value of that property. For a meta-language style sheet declaration, the value of a style sheet property may reference a meta-language style sheet variable. The following three lines are an example of a meta-language style sheet rule definition that may be specified in the input meta-language style sheet 310:
 1: .content-navigation
 2: border-color: $blue
 3: color: #3bbfce
In the above example meta-language style sheet rule definition, Line 1 specifies a style sheet selector ('.content-navigation'). Line 2 is a meta-language style sheet declaration specifying the style sheet property ('border-color') and referencing the meta-language style sheet variable ('$blue'). Line 3 is a web browser style sheet declaration specifying the style sheet property ('color') and the value ('#3bbfce').

The output meta-language style sheet 312 and the output web browser style sheet 314 are generated and stored in the storage(s) 306 by the web page live styler. Generation of the output meta-language style sheet 312 and the output web browser style sheet 314 by the web page live styler is explained in greater detail below. Like the input meta-language style sheet 310, the output meta-language style sheet 312 may be formatted according to a meta-language style sheet language (e.g., the Syntactically Awesome Style Sheet (SASS) language, the LESS language, etc). The output web browser style sheet 314 may be formatted according to a web browser style sheet language (e.g., Cascading Style Sheet (CSS) language).

The device 300 further comprises one or more user interface components 320 coupled to the bus 302. These components 320 enable the device 320 to receive input from and provide output to a user. On the input side, the user interface components 320 may include input mechanism(s) 322, for example, a keyboard/keypad having alphanumeric keys, a cursor control device (e.g. mouse, trackball, touchpad, etc.), a touch sensitive screen capable of receiving user input, a microphone for receiving audio input, etc. On the output side, the components 320 may include a graphical interface (e.g. a graphics card) and an audio interface (e.g. sound card) for providing visual and audio content. The user interface components 320 may further include a display 324 (in one embodiment, the display 322 is a touch sensitive display) for presenting visual content. In one embodiment, the web page live styler executed by the processor(s) 304 may provide a software user interface that takes advantage of and interacts with the user interface components 320 to receive input from and provide output to a user. This software user interface may, for example, provide menus that the user can navigate using one of the user input devices mentioned above, soft buttons that can be invoked via touch, a soft keyboard, etc. This software interface may also interact with a touch sensitive display to receive information indicating which location(s) of the touch sensitive display is being touched by the user and to translate this information into input that the web page live styler can use (e.g. to determine which menus are selected, which soft buttons are depressed, etc). These and other functions may be performed by the software user interface provided by the web page live styler.

In addition to the components set forth above, the device 300 may further comprise one or more data communication interfaces 326 coupled to the bus 102. These interfaces 326 enable the device 300 to communicate with other components. The communication interfaces 326 may include, for example, a network interface (wired or wireless) for enabling the device 300 to send messages to and receive messages from a data network such as, for example, a Local Area Network (LAN). The communications interfaces 326 may also include a 3G or 4G interface for enabling the device 300 to access the Internet without using a local network. The communication interfaces 326 may further include a telephone network interface for enabling the device 300 to conduct telephone communications. The communication interfaces 326 may further include a wireless interface (e.g. Bluetooth) for communicating wirelessly with nearby devices, such as wireless headsets, earpieces, etc. The communication interfaces 326 may further comprise a jack for interfacing with a set of wired headphones, headsets, earphones, etc. These and other interfaces may be included in the device 300.

Sample Operation

With the above description in mind, and with reference to FIGS. 1-4, the operation of device 300 in accordance with one embodiment of the present invention will now be described in greater detail. In the following description, the operations will be described as being performed by the device 300. It should be understood that, in one embodiment, the device 300 performs these operations by having the processor(s) 304 execute the web page live styler, and having the processor(s) 304 interact with the various other components (e.g., input mechanism(s) 322, display 324, data communication interface(s) 326, etc).

Overall Web Page Live Styling Functionality

Figure 4:
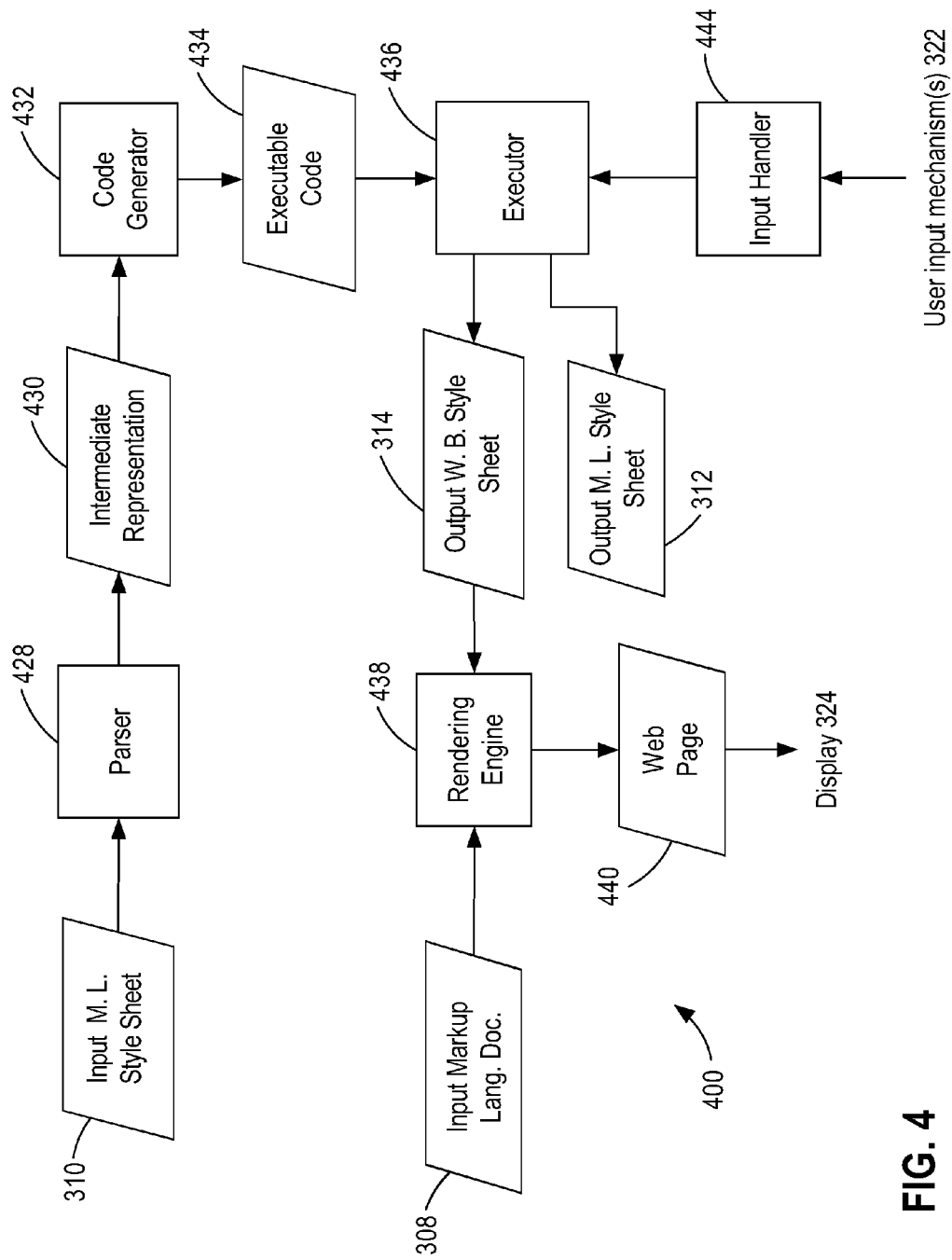
FIG. 4 is a flow diagram illustrating the overall web page live styling operations performed by a device, in accordance with one embodiment of the present invention.

With reference to FIG. 4, there is shown a flow diagram 400 illustrating the overall web page live styling operations performed by the device 300, in accordance with one embodiment of the present invention. In preparation of invoking these operations, a developer may interface with the device 300 or another device to provide the input markup language document 308 and the input meta-language style sheet 310 to the device 300 on storage(s) 306. For example, the developer may write, edit, or create and store the markup language document 308 and the meta-language style sheet 310 in storage(s) 306 using a suitable computer application. For example, the suitable computer application may be a text editing application or other computing application suitable for generating and storing markup language documents and meta-language style sheets. Alternatively, separate computing applications may be used, one for generating and storing markup language documents and one for generating and storing meta-language style sheets. In both cases, the computer application may include the web page live styler as a component thereof. Alternatively, the web page live styler can be a stand-alone application separate from other applications for generating and storing markup language documents and meta-language style sheets. As described in greater detail below, the developer may invoke the post-styling functionality of the web page live styler at the end of a first web page live styling process to generate and store the output meta-language style sheet 312 which can then be used as the input meta-language style sheet 310 to start a second web page live styling process. Once the input markup language document 308 and the input meta-language style sheet 310 are provided on storage(s) 306, the developer may then invoke the web page live styler. After that is done, the device 300 will perform the operations shown in FIG. 4.

As mentioned, the overall web page live styling functionality includes pre-styling functionality, styling function, and post-styling functionality. With the pre-styling functionality, the input meta-language style sheet 310 is parsed by parser 428 to produce an intermediate representation 430 of the input meta-language style sheet 310. A code generator 432 uses the intermediate representation 430 to produce executable code 434. The executable code 434 is then executed by an executor 436 to produce an initial output web browser style sheet 314 corresponding to the input meta-language style sheet 310. The initial output web browser style sheet 314 and the input markup language document 308 are provided as input to a web page layout and rendering engine 438 which produces an initial web page 440 on the display 324.

Once the pre-styling functionality has completed, the styling functionality may be invoked. To do so, input directed to a user interface control that controls the value of a corresponding meta-language style sheet variable declared in the input meta-language style sheet 310 is provided via a user input mechanism(s) 322 to an input handler 444. In response to the input, the input handler 444 receives data specifying a new value for the corresponding meta-language style sheet variable. The input handler 444 signals the executor 436 to re-execute the executable code 434 to produce a new output web browser style sheet 314 according to the new value. The new output web browser style sheet 314 is provided to the rendering engine 438 causing the display of the initial web page 440 to be updated according to the new web browser style sheet 414 to produce an updated web page 440.

According to experiments conducted by the inventor, the time between when the input directed to the user interface control is caused by a user input mechanism(s) 322 and the updated web page 440 is produced can be as short as or shorter than a hundred milliseconds. This "feedback" time is noticeably shorter than the feedback time of the cumbersome approach to web page live styling described above with respect to FIG. 1.

According to experiments, the inventor observed approximately an order of magnitude reduction in feedback time between the cumbersome approach of FIG. 1 and the streamlined approach of FIG. 2. In one case using an industry standard Intel processor based workstation computer, the inventor observed an approximately 40 millisecond feedback time.

This relatively shorter feedback time is accomplished in part because of the pre-styling functionality that pre-compiles the input meta-language style sheet 310 into an executable code form 434 that can be efficiently executed and re-executed with varying meta-language style sheet variable values to rapidly produce different output web browser style sheets 414.

Web page layout and rendering engines are available that, when provided a new web browser style sheet to replace a current web browser style sheet, only update the display of those web page elements of the currently displayed web page whose style has changed from the current web browser style sheet to the new web browser style sheet. In this way, re-rendering of the entire web page is avoided when the new web browser style sheet is provided.

A web page layout and rendering engine with this selective element update feature may be used as rendering engine 438 to achieve lower feedback times. However, for purposes of the present invention, a rendering engine with this feature is not required and virtually any web browser layout and rendering engine may be used as rendering engine 438. Listed below are some, but not all, of the web browser layout and rending engines that may be used referenced by their well-known project name.

1. WebKit.
2. Gecko.
3. Trident.
4. Presto.

With the styling functionality, a developer may repeatedly adjust the values of meta-language style sheet variables declared in the input meta-language style sheet 310 by directing input to the user interface controls until the desired appearance of the web page 440 is achieved. The styling functionality causes the display of the web page 440 to be updated virtually instantaneously in response to each adjustment. When compared to the cumbersome approach of FIG. 1, the styling functionality of the web page live styler provides the developer greater flexibility and efficiency in live styling the web page 440. With the styling functionality, repetitive compilation of the input meta-language style sheet 310 is avoided.

Once the developer has achieved the desired look and feel of the web page with the styling functionality, the developer may invoke the post-styling functionality to generate and store on storage(s) 306 a copy of the current output web browser style sheet 314 and/or an output meta-language style sheet 312. Both the copy of the current output web browser style sheet 314 and the output meta-language style sheet 312 are based on the values of the meta-language style sheet variables as specified in the input meta-language style sheet 310 and as currently adjusted, if adjusted, by the developer using the styling functionality.

With post-styling functionality, the developer can effectively capture, in the form of a meta-language style sheet and a web browser style sheet, the changes the developer made to the initial web page 440 using the styling functionality. The output meta-language sheet 312 may be used as an input meta-language style sheet 310 for another invocation of the overall web page live styling functionality and so on, as often as desired, until an output web browser style sheet 314 and/or an output meta-language style sheet 312 reflecting the desired appearance of the web page 440 is realized.

Sample Detailed Operation

With the above description in mind, and with reference to FIGS. 1-5, the operation of device 300 in accordance with one embodiment of the present invention will now be described in yet greater detail.

Intermediate Representation

The device 300 parses in a top-down manner the input meta-language style sheet 310 to produce the intermediate representation 430. Once this is done, the device 300 uses the intermediate representation 430 to generate the executable code 434. The executable code 434, when executed, produces an output web browser style sheet 314. To parse the input meta-language style sheet 310, the device 300 performs a top-down lexical analysis of the style sheet 310 to produce a sequence of tokens. The tokens are syntactically analyzed with reference to a formal grammar (e.g., a Bakus-Naur Form (BNF) grammar) that represents the meta-language style sheet language (e.g., the Syntactically Awesome Style Sheet (SASS) language) of the input meta-language style sheet 310. This syntactic analysis produces the intermediate representation 430 which takes the form of a parse tree, syntax tree, or the like.

As part of the syntactic analysis, the device 310 identifies meta-language style sheet variable declarations and meta-language style sheet rule definitions and constituent parts thereof. The intermediate representation 430 includes metadata identifying and data typing the meta-language style sheet variable declarations, the meta-language style sheet rule definitions, and the constituent parts. As explained in greater detail below, this metadata is used by the device 300 when generating the executable code 434.

Conceptually, the intermediate representation 430 may be viewed as a tree that is constructed by the device 300 as the device 300 encounters meta-language style sheet variable declarations and meta-language style sheet rules while parsing the input meta-language style sheet 310 in a top-down manner. The left or right side of the tree contains the meta-language style sheet variable declarations and meta-language style sheet rule definitions at the beginning of the input meta-language style sheet 310 and the other of the left or right side of the tree contains the meta-language style sheet variable declarations and meta-language style sheet rule definitions from the end of the input meta-language style sheet 310.

Figure 5:
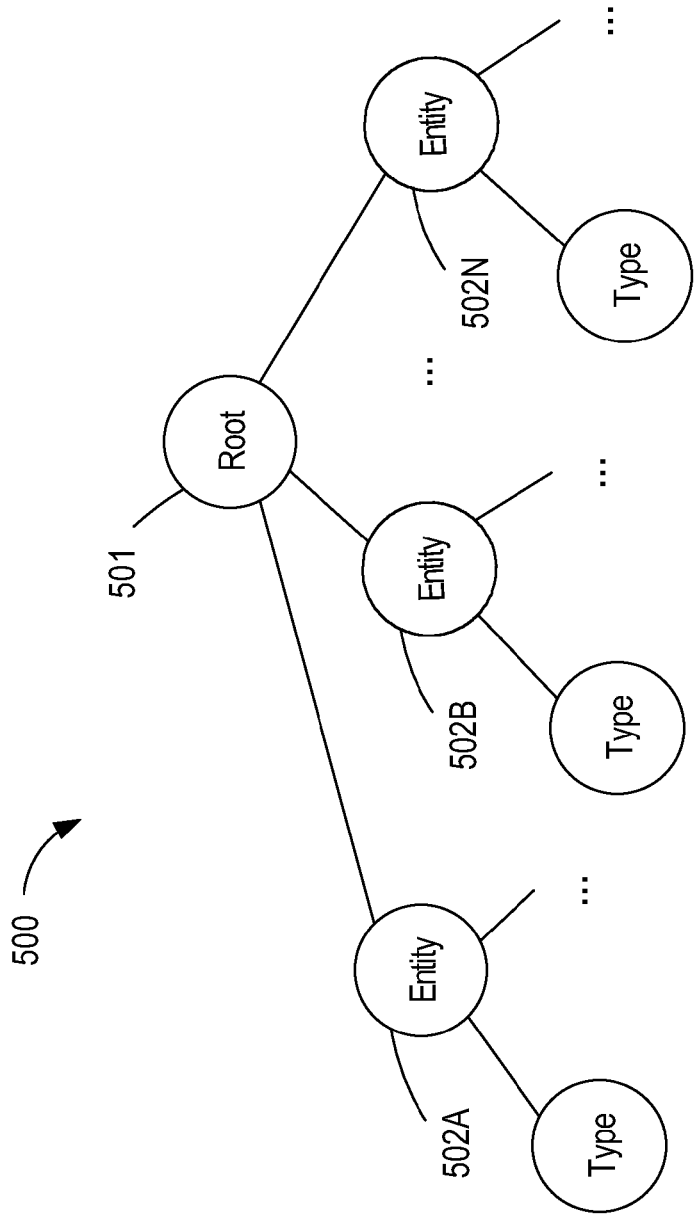
FIG. 5 is illustrates a tree-based intermediate representation of an input meta-language style sheet, in accordance with one embodiment of the present invention.

FIG. 5 illustrates a possible tree representation 500 of the intermediate representation 430. The tree 500 has a root node 501. The direct child nodes of the root node 501 represent one or more meta-language style sheet entities 502A-N identified in the input meta-language style sheet 310 by the device 300 when parsing the input meta-language style sheet 310.

A meta-language style sheet entity 502 may correspond to a meta-language style sheet variable declaration or meta-language style sheet rule definition. Each of the entity nodes 502 in the tree 500 may viewed as being ordered from first sibling 502A to the N-th sibling 502N either from left to right in the tree or from right to left. The order represents the order in which the corresponding meta-language style sheet entities were encountered in the input meta-languages style sheet 310 when parsing.

Each entity node 502 has at least one direct child node which indicates the type of the parent entity node 502. Although shown as a first child node in FIG. 5, is it not required that this entity type node be a first child node the entity type node can be between two other types of sibling nodes.

Intermediate Representation Example

As an example of generating the intermediate representation 430, consider the following example input meta-language style sheet 310:

1: $base: red;
2: menu {
3: color: lighten($base, 10%)
4: }

In the above example meta-language style sheet, Line 1 contains a meta-language style sheet variable declaration and Lines 2-4 represent a meta-languages style sheet rule definition. In the meta-language style sheet variable declaration at line 1, a meta-language style sheet variable is declared with the name ('$base') and assigned an initial value ('red'). The meta-language style sheet rule definition has a selector ('menu') and one style sheet declaration specifying the style sheet property ('color') with a value that references the meta-language style sheet function ('lighten'). A reference to the meta-language style sheet variable ('$base) and the value ('10%') are passed as parameters to the (lighten') function. The effect of the ('lighten') function, when executed, is to compute a 10% lightened value of the current color value of the ('$base') variable and assign the computed value to the ('color') style sheet property.

The device 300 may parse the above example meta-language style sheet to produce the following example intermediate representation 430 expressed in JavaScript Object Notation (JSON):

```
01:     [
02:         {
03:             "type": "VariableDeclaration",
04:             "name": "$base",
05:             "value": {
```

-continued

```
06:            "type": "Constant",
07:            "value": "red",
08:            "dataType": "Literal"
09:          }
10:        },
11:        {
12:          "type": "RuleDefinition",
13:          "selectors": [
14:            "menu"
15:          ],
16:          "statements": [
17:            {
18:              "type": "Declaration",
19:              "property": "color",
20:              "value": {
21:                "type": "FunctionCall",
22:                "id": "lighten",
23:                "args": [
24:                  {
25:                    "type": "Variable",
26:                    "name": "$base",
27:                  },
28:                  {
29:                    "type": "Constant",
30:                    "value": "10%",
31:                    "dataType": "Percentage",
32:                  }
33:                ]
34:              }
35:            }
36:          ]
37:        }
38:      ]
```

A tree-based 500 intermediate representation 430 of the above-example input meta-language style sheet 310 has one entity node 502 for the meta-language style sheet variable declaration at Line 1 of the example input meta-language style sheet and another entity node 502 for the meta-language style sheet rule definition at Lines 2-4.

With respect to the above-example JSON-based intermediate representation 430, the entity node 502 for the meta-language style sheet variable declaration at Line 1 of the example input meta-language style sheet corresponds to Lines 2-10 of the example JSON-based intermediate representation and the other entity node 502 for the meta-language style sheet rule definition at Lines 2-4 of the example input meta-language style sheet corresponds to Lines 11-37 of the example JSON-based intermediate representation 430. The first sibling entity node 502A corresponds to the meta-language style sheet variable declaration at Line 1 of the example input meta-language style sheet.

The second sibling entity node 502B corresponds to the meta-language style sheet rule definition at Lines 2-4 of the example input meta-language style sheet. The entity node 502 corresponding to the meta-language style sheet variable declaration at Line 1 of the example input meta-language style sheet has a child entity type node that indicates that its parent entity node is of type "VariableDeclaration". This entity type node corresponds to Line 3 of the above-example JSON-based intermediate representation 430.

The entity node 502 corresponding to the meta-language style sheet rule definition at Lines 2-4 of the example input meta-language style sheet has a child entity type node that indicates that its parent entity node is of type "RuleDefinition". This entity type node corresponds to Line 12 of the above-example JSON-based intermediate representation 430.

While the above examples describe a particular tree-based and JSON-based intermediate representation 430, the present invention is not limited to only a JSON-based and a tree-based representation and other types and forms of the intermediate representation 430 that facilitate generation of the executable code 434 may be used. All such types and forms are within the scope of the present invention.

Executable Code

According to one embodiment, to generate the executable code 434 with the pre-styling functionality, the device 300 walks, traverses, or iterates over the intermediate representation 430 visiting meta-language style sheet variables declarations and meta-language style sheet rule definitions in the order they were declared in the input meta-language style sheet 310. Sequences of executable instructions are generated by the device 300 for each visited meta-language style sheet variable declaration and meta-language style sheet rule definition in the order visited. These sequences may be joined together in the order generated to form the executable code 434. The sequences of instructions may be generated in any convenient programming language such as, for example, JavaScript, Python, Ruby, C/C++, Java, and the like.

Once the entire sequence of instructions for the executable code 434 has been formed by the device 300, the entire sequence may be compiled into a bytecode or binary form for faster execution by the device 300. However, this extra compilation is not necessary.

Once the executable code 434 has been generated, it may be stored in non-volatile storage(s) 306 and may be executed repeatedly by the styling functionality until a new and different input meta-language style sheet 310 is obtained at which time new executable code 434 is generated from the new and different input meta-language style sheet 310 by the pre-styling functionality.

Any number of known dependency tracking techniques may be used by the device 300 to determine whether a new input meta-language style sheet 310 is different from the input meta-language style sheet 310 from which the current executable code 434 was generated. For example, when executable code 434 is generated from an input meta-language style sheet 310, a modification date/time of checksum of the input meta-language style sheet 310 may be stored in storage(s) 306. When a new input meta-language style sheet 310 is obtained, a modification date/time or checksum of the new input meta-language style sheet 310 is obtained to determine whether the new input meta-language style sheet 310 is different from the input meta-language style sheet 310 from which the current executable code 434 was generated. If different, then new executable code 434 is generated from the new input meta-language style sheet 310 to replace the current executable code 434.

User Interface/Executable Code Interface

In one embodiment, the executable code 434 accepts as input a set of name-value mappings between meta-language style sheet variable names and current values for the meta-language style sheet variables. Each name-value mapping in the set corresponds to a meta-language style sheet variable declared in the input meta-language style sheet 310. The initial set of mappings may be generated by the pre-styling functionality from the intermediate representation 430. The set may then be updated by the styling functionality in response to input directed to user interface controls corresponding to the declared meta-language style sheet variables. With the styling functionality, the value of a name-value mapping in the set represents the current value of the corresponding meta-language style sheet variable as controlled by a corresponding user interface control. When input is directed to a user interface control for a meta-language style sheet variable, a new value for the meta-language style sheet variable is obtained by the input handler 444 and the name-value mapping for the meta-language style sheet variable is updated in the set to reflect the new value. Once this update is done, the device 300 executes the executable code 434 providing the updated set of name-value mappings as input to an execution namespace in which the executable code 434 executes. The executable code 434, when executing in this namespace, dereferences the set of name-value mappings to produce an output web browser style sheet 314 and/or an output meta-language style sheet 312 that reflects the new value for the for the meta-language style sheet variable.

For example, considering again the above-example meta-language style sheet containing the meta-language style sheet variable declaration for the ("$base") meta-language style sheet variable, the set of name-value mappings initially generated by the pre-styling functionality may be as follows, expressed in JSON notation for convenience of expression:

1: {
2: "$base": "#FF0000"
3: }

Here, there is only one name-value mapping as there is only one meta-language style sheet variable declaration in the input meta-language style sheet 310. The set of initial name-value mappings can be determined by the device 300 from the intermediate representation 430, in this example, from the data corresponding to Lines 2-10 of the above-example JSON-based intermediate representation 430. In this example, the name ("_base") is derived from the name of the corresponding meta-language style sheet variable.

Use of a set of name-value mappings as described above is just one possible way of interfacing the executable code 434 with the user interface, and in particular, with the user interface controls corresponding to the meta-language style sheet variables. However, other programmatic interfaces may be used and the present invention is not limited to only the interface described above. More generally, any programmatic interface that can provide to the executable code 434 the new values for meta-language style sheet variables as they are adjusted by user interface controls without having to entirely re-generate the executable code 434 may be used. Ideally, once the executable code 434 is generated from the intermediate representation 430 by the pre-styling functionality, the styling functionality does not need to re-generate the executable code 434 from the intermediate representation 430 as this may be a relatively computationally intensive operation that would reduce styling feedback time. Instead, the styling functionality, in response to user input directed to a user interface control corresponding to a meta-language style sheet variable, uses a programmatic interface to the executable code 434 to provide to the executable code 434 the new value for the meta-language style sheet variable and executes the executable code 434 to generate a new output web browser style sheet 314 and/or output meta-language style sheet 312 that reflects the new value, without having to re-generate the executable code 434. Any programmatic interface suitable for this purpose can be used and all such interfaces are within the scope of the present invention.

Other data structures that may be passed to the execution namespace of the executable code 434 via a programmatic interface may include, among others, a data structure that indicates whether one or both of an output web browser style sheet 314 and the output meta-language style sheet 312 are to be generated by the executable code 434. Additionally, data structures such as data stream or data socket data structures may be passed to the execution namespace to which the contents of the output web browser style sheet 314 and the output meta-language style sheet 312 are written to by the executable code 434. These and other data structures may be passed into the execution namespace of the executable code 434 via a programmatic interface.

In one embodiment, the device 300 provides a library of reusable helper routines to the executable code 434 via the executable namespace. These helper routines implement common and reusable functionality and may be invoked by the executable code 434. In one embodiment, the library contains helper routines for one or more helper functions that are supported by the meta-language style sheet language of the input meta-language style sheet 310.

Execution Code Example

The following Javascript code represents a portion of example execution code 434 that may be generated by the device 300 from an intermediate representation 430:

01: set("$base", color(_base));
02: ruleset(["menu"], function( ){
03: declare("color", execute("lighten", [
04: get("$base"),
05: number(10, "%")
06: ]));
07: });

In this example, the portion of execution code 434 is generated by the device 300 from the JSON-based intermediate representation 430 example provided above. In particular, line 1 of the example executable code 434 is generated based on lines 2-10 of the example JSON-based intermediate representation 430. Lines 2-7 of the above-example executable code 434 are generated based on lines 11-37 of the example JSON-based intermediate representation 430.

In line 1 of the example executable code 434, the ("set") helper routine is invoked. The ("set") routine assigns a passed value to a named key in a key-value data dictionary. Here, the named key is the meta-language style sheet variable name ("$base") obtained from the JSON-based intermediate representation 430 (line 4). The key value is the output of the ("color") helper function which accepts a color name (e.g., "red", "green", blue", etc.) as input and produces as output a string representing a color in an RGB color space (e.g., the string ("#FF0000")). The current value of the Javascript variable ("_base") is passed to the ("color") helper function. In this example, the Javascript variable ("_base") is part of the set of variable assignments and is controlled by a corresponding user interface control. The ("_base") variable is initially set to the string ("red") as per line 1 of the above-example input meta-language style sheet 310.

In lines 2-7 of the example executable code 434, the ("ruleset") helper routine is invoked. The ("ruleset") function accepts as input a list of style sheet selectors and a set of style sheet declarations. For each property assignment, the ("declare") function sets the property value and the associated executable code ("function") needed to produce the value for the said property. In the example, the value is not from a simple constant, it is a result of the special function "lighten" hence the executable code specified the invocation of this function ("execute") along with the arguments needed for the function in an array.

While the above examples describe a particular Javascript-based executable code 434, the present invention is not limited to only the Javascript and other programming or scripting languages may be used. All such programming or scripting languages are within the scope of the present invention.

Example Output Web Browser Style Sheet

The executable code 434, when executed in response to user input directed to a user interface control that corresponds to a meta-language style sheet variable, produces an output web browser style sheet 314 and/or an output meta-language style sheet 312 that reflects a new value for the meta-language style sheet variable as determined by the user input directed to the user interface control. The following is example of an output web browser style sheet 314 that may be generated by the example executable code 434 described above if the user input control corresponding to the $base meta-language style sheet variable being set to indicate the color red (RGB: #FF0000):

```
1: menu {
2: color: #ff3333;
3: }
```

The following is example of an output meta-language style sheet 312 that may be generated by the example executable code 434 described above in response to the user input control corresponding to the $base meta-language style sheet variable being set to indicate the color red (RGB: #FF0000):

```
1: $base: red;
2: menu {
3: color: lighten($base, 10%)
4: }
```

Summary of Methodology

Referring now to FIG. 6, a method for live styling a web page without having to repeatedly compile a meta-language style sheet may be summarized as follows.

At step 601, an input meta-language style sheet is parsed by the web page live styler. Typically, the input meta-language style sheet will contain at least one meta-language style sheet variable declaration and at least one meta-language style sheet rule definition referencing the at least one meta-language style sheet variable.

At step 602, the live styler generates an intermediate representation of the input meta-language style sheet based on the parsing. The intermediate representation includes a representation of the at least one meta-language style sheet variable declaration and a representation of the at least one meta-language style sheet rule definition.

As shown at step 603, executable code for generating an output web browser style sheet and/or and output meta-language style sheet is generated from the intermediate representation. The live styler generates the executable code from at least both of the intermediate representation of the meta-language style sheet variable declaration and the intermediate representation of the meta-language style sheet rule definition. The executable code can take any number of different executable forms such as script instructions, bytecode instructions, binary instructions, or any other form capable of being executed, interpreted, or otherwise processed by a computer processor or computing program.

At step 604, user input is directed to a user interface control of a user interface of the live styler that indicates a new value for the at least one meta-language style sheet variable. In response to the user input, the live styler executes the executable code to produce an output web browser style sheet that reflects the new value.

At step 605, a displayed web page is updated using the output web browser style sheet, so that the display of the web page is updated to reflect the new value for the at least one meta-language style sheet variable. Typically, this display update is accomplished using an Application Programming Interface (API) of a browser rendering engine that renders the web page.

Steps 604 and 605 may be repeated without having to recompile the input meta-language style sheet.

CONCLUSION

Previously, there has been no mechanism available for live styling a web page without having to repeatedly compile a meta-language style sheet. The techniques and mechanisms described herein assist web application developers to carry out a cycle of a streamlined web page live styling process that does not require compiling a meta-language style sheet between changing the value for a meta-language style sheet variable and viewing the effect of the change on the appearance of a web page. With the styling process, a developer can direct input to a user interface control to change the value of a corresponding meta-language style sheet variable. In response to the input, presentation of a web page is virtually instantaneously updated to reflect the changed value. The developer may repeatedly direct input to the user interface controls until the desired web page appearance is achieved. With the styling process, a web page developer is able to change values of meta-language style sheet variables and view the effects of those changes on a web page to a much greater degree than is currently possible.

In the foregoing specification, embodiments of the present invention have been described with reference to numerous specific details that may vary from implementation to implementation. Thus, the sole and exclusive indicator of what is the invention, and is intended by Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device, comprising:
   a web page live styler configured to cause the device to perform the operations of:
   parsing a meta-language style sheet comprising at least one meta-language style sheet variable declaration and at least one meta-language style sheet rule definition referencing the at least one meta-language style sheet variable;
   generating, based on the parsing, an intermediate representation of the meta-language style sheet variable declaration and an intermediate representation of the meta-language style sheet rule definition;
   generating executable code based at least on both the intermediate representation of the meta-language style sheet variable declaration and the intermediate representation of the meta-language style sheet rule definition;
   executing the executable code to produce a web browser style sheet; and
   updating display of a web page using the web browser style sheet.

2. The device of claim 1, wherein the meta-language style sheet variable declaration comprises a name of the meta-language style sheet variable and a value of the meta-language style sheet variable.

3. The device of claim 1, wherein the meta-language style sheet rule comprises at least one selector and at least one style sheet rule declaration, the style sheet rule declaration comprising a style sheet property and a reference to the meta-language style sheet variable.

4. The device of claim 3, wherein the reference is by a declared name of the meta-language style sheet variable.

5. The device of claim 1, wherein the intermediate representation of the meta-language style sheet variable declaration comprises data that specifies that the intermediate representation of the meta-language style sheet variable declaration represents a meta-language style sheet variable declaration.

6. The device of claim 1, wherein the intermediate representation of the meta-language style sheet rule comprises data that specifies that the intermediate representation of the meta-language style sheet rule represents a meta-language style sheet rule.

7. The device of claim 1, wherein the steps of executing the executable code and updating display of the web page are performed in response to user input directed to a user interface control, wherein the user interface control controls the value of a variable representing the meta-language style sheet variable, wherein the user input indicates a new value for the variable representing the meta-language style sheet variable.

8. The device of claim 1, wherein the web page live styler is further configured to cause the device to perform the operation of executing the executable code to produce a new meta-language style sheet.

9. The device of claim 1, wherein the web page live styler is further configured to cause the device to perform the operations of:
   obtaining a plurality of new values for the meta-language style sheet variable; and
   in response to obtaining each new value, performing the operations of:
      executing the executable code using the each new value to produce a web browser style sheet that reflects the each new value, and
      updating display of a web page using the web browser style sheet that reflects the each new value.

10. One or more non-transitory computer-readable storage media storing instructions that, when executed by one or more computing devices, causes the one or more computing devices to perform a method comprising:
   parsing a meta-language style sheet comprising at least one meta-language style sheet variable declaration and at least one meta-language style sheet rule definition referencing the at least one meta-language style sheet variable;
   generating, based on the parsing, an intermediate representation of the meta-language style sheet variable declaration and an intermediate representation of the meta-language style sheet rule definition;
   generating executable code based at least on both the intermediate representation of the meta-language style sheet variable declaration and the intermediate representation of the meta-language style sheet rule definition;
   executing the executable code to produce a web browser style sheet; and
   updating display of a web page using the web browser style sheet.

11. The one or more non-transitory storage media of claim 10, wherein the meta-language style sheet variable declaration comprises a name of the meta-language style sheet variable and a value of the meta-language style sheet variable.

12. The one or more non-transitory storage media of claim 10, wherein the meta-language style sheet rule comprises at least one selector and at least one style sheet rule declaration, the style sheet rule declaration comprising a style sheet property and a reference to the meta-language style sheet variable.

13. The one or more non-transitory storage media of claim 12, wherein the reference is by a declared name of the meta-language style sheet variable.

14. The one or more non-transitory storage media of claim 10, wherein the intermediate representation of the meta-language style sheet variable declaration comprises data that specifies that the intermediate representation of the meta-language style sheet variable declaration represents a meta-language style sheet variable declaration.

15. The one or more non-transitory storage media of claim 10, wherein the intermediate representation of the meta-language style sheet rule comprises data that specifies that the intermediate representation of the meta-language style sheet rule represents a meta-language style sheet rule.

16. The one or more non-transitory storage media of claim 10, wherein the steps of executing the executable code and updating display of the web page are performed in response to user input directed to a user interface control, wherein the user interface control controls the value of a variable representing the meta-language style sheet variable, wherein the user input indicates a new value for the variable representing the meta-language style sheet variable.

17. The one or more non-transitory storage media of claim 10, the method further comprising executing the executable code to produce a new meta-language style sheet.

18. The one or more non-transitory storage media of claim 10, the method further comprising:
   obtaining a plurality of new values for the meta-language style sheet variable; and
   in response to obtaining each new value, performing the operations of:
      executing the executable code using the each new value to produce a web browser style sheet that reflects the each new value, and
      updating display of a web page using the web browser style sheet that reflects the each new value.

19. A method comprising:
   parsing a meta-language style sheet comprising at least one meta-language style sheet variable declaration and at least one meta-language style sheet rule definition referencing the at least one meta-language style sheet variable;
   generating, based on the parsing, an intermediate representation of the meta-language style sheet variable declaration and an intermediate representation of the meta-language style sheet rule definition;
   generating executable code based at least on both the intermediate representation of the meta-language style sheet variable declaration and the intermediate representation of the meta-language style sheet rule definition;
   obtaining a plurality of new values for the meta-language style sheet variable; and
   in response to obtaining each new value, performing the operations of:
      executing the executable code using the each new value to produce a web browser style sheet that reflects the each new value, and
      updating display of a web page using the web browser style sheet that reflects the each new value;
   wherein the method is performed by one or more computing devices.

20. The method of claim 19, the method further comprising executing the executable code to produce a new meta-language style sheet.

21. The method of claim 19, wherein the meta-language style sheet variable declaration comprises a name of the meta-language style sheet variable and a value of the meta-language style sheet variable.

22. The method of claim 19, wherein the meta-language style sheet rule comprises at least one selector and at least one style sheet rule declaration, the style sheet rule declaration comprising a style sheet property and a reference to the meta-language style sheet variable.

23. The method of claim 22, wherein the reference is by a declared name of the meta-language style sheet variable.

24. The method of claim 19, wherein the intermediate representation of the meta-language style sheet variable declaration comprises data that specifies that the intermediate representation of the meta-language style sheet variable declaration represents a meta-language style sheet variable declaration.

25. The method of claim 19, wherein the intermediate representation of the meta-language style sheet rule comprises data that specifies that the intermediate representation of the meta-language style sheet rule represents a meta-language style sheet rule.

* * * * *